United States Patent

Koch et al.

[11] Patent Number: 5,970,730
[45] Date of Patent: Oct. 26, 1999

[54] METHOD OF COOLING COATED FOODS, PARTICULARLY CONFECTIONERY AND BAKED GOODS

[75] Inventors: Peter Koch, Pinneberg, Germany; Joost J. de Koomen, Mechanicsburg, Pa.

[73] Assignee: Hosokawa Kreuter GmbH, D-22419 Hamburg, Germany

[21] Appl. No.: 09/072,105

[22] Filed: May 4, 1998

[30] Foreign Application Priority Data

May 6, 1997 [DE] Germany .............. 197 24 639

[51] Int. Cl.⁶ ...................................... F25D 17/04
[52] U.S. Cl. ................... 62/186; 62/63; 62/380
[58] Field of Search .................... 62/63, 186, 380

[56] References Cited

U.S. PATENT DOCUMENTS

| | | |
|---|---|---|
| 4,142,376 | 3/1979 | Sandberg . |
| 4,276,753 | 7/1981 | Sandberg et al. . |
| 5,102,040 | 4/1992 | Harvey . |
| 5,544,697 | 8/1996 | Clark . |
| 5,605,049 | 2/1997 | Moore et al. ................ 62/63 |

FOREIGN PATENT DOCUMENTS

| | | |
|---|---|---|
| 0667503 | 8/1995 | European Pat. Off. . |
| 2322918 | 11/1974 | Germany . |
| 4311589 | 10/1994 | Germany . |

*Primary Examiner*—Ronald Capossela
*Attorney, Agent, or Firm*—Friedrich Kueffner

[57] ABSTRACT

A method of cooling coated foods, particularly confectionery and baked goods, wherein the goods are moved by a conveyor belt through a cooling duct, and wherein air is used as the cooling agent. Alternatively, the goods are conveyed by a conveyor belt through a cooling duct above base plates forming heat exchangers, wherein a liquid cooling agent flows through the heat exchangers. The method includes adjusting a delta-T (actual value) between cooling agent exit and cooling agent entry for a certain product to be coated by regulating the cooling agent flow speed, entering this delta-T as nominal value in a computer as the parameter for further cooling of this product, and regulating the cooling agent entry temperature, particularly in the case of production interruption or restart of production, by the difference determined in the computer between the delta-T determined as the nominal value and the actually measured value.

7 Claims, 1 Drawing Sheet

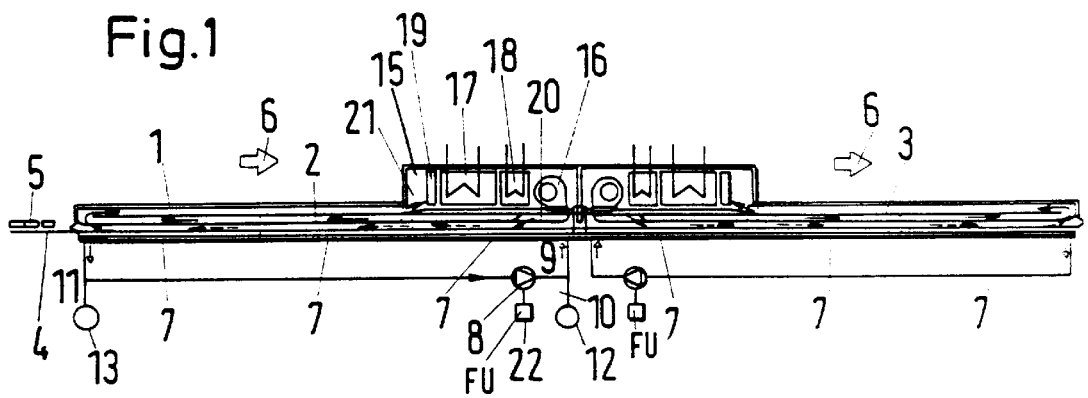
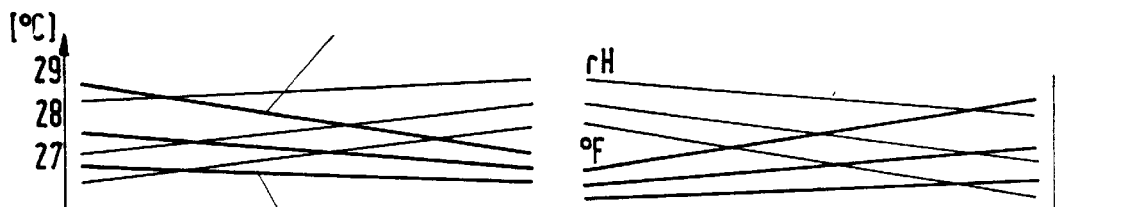
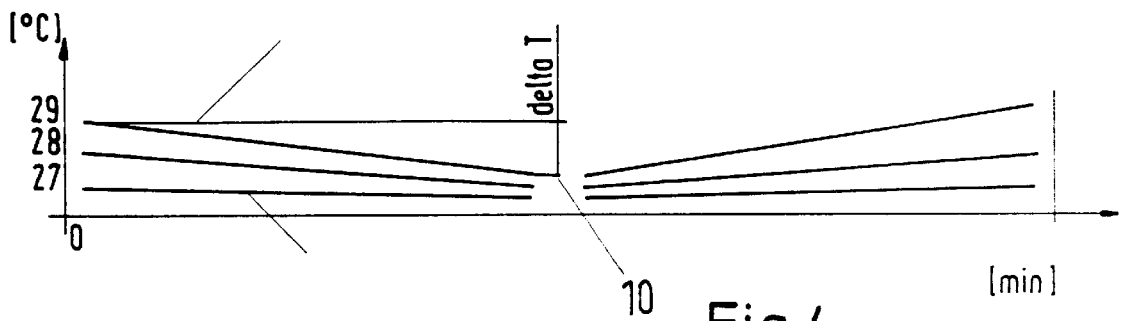
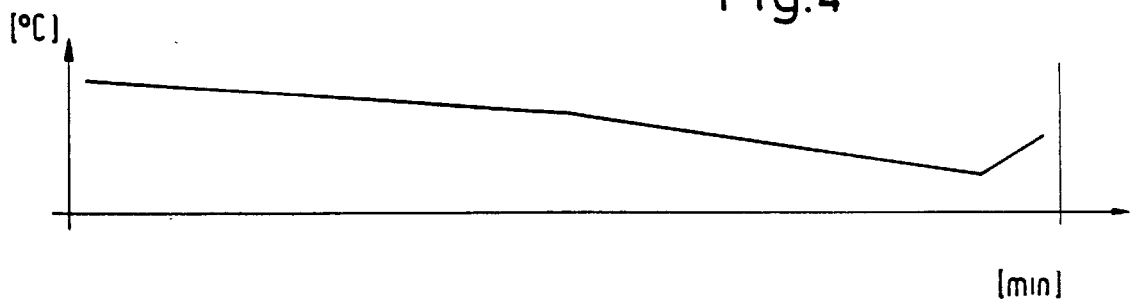

METHOD OF COOLING COATED FOODS, PARTICULARLY CONFECTIONERY AND BAKED GOODS

BACKGROUND OF THE INVENTION

1. Field of the Invention

The present invention relates to a method of cooling coated foods, particularly confectionery and baked goods, wherein the goods are moved by a conveyor belt through a cooling duct, and wherein air is used as the cooling agent. Alternatively, the goods are conveyed by a conveyor belt through a cooling duct above base plates forming heat exchangers, wherein a liquid cooling agent flows through the heat exchangers.

2. Description of the Related Art

A method of the above-described type is basically known from DE-A1-43 11 589. In that known method, air is used as the cooling agent. The process is then called convection cooling and/or radiation cooling. It is also known in the art to carry out cooling by means of base plates which are arranged underneath the conveyor belt and through which flows a liquid cooling agent, preferably water. In that case, the process is called contact cooling or radiation cooling.

A combination of the two types of cooling is also known in the art, i.e., cooling takes place on the upper side by a convection cooling with air and on the lower side by a contact cooling by means of base plates. Cooling takes place in a co-current flow method or a counter-current flow method. In the co-current flow method, the conveying direction and the flow direction of the cooling agent are the same. In the counter-current flow method, the flow directions are oppositely directed. The counter-current flow method has the advantage that the difference between the temperature of the cooling agent and the temperature of the products to be cooled is smaller. In the known apparatus, the cooling agent normally flows parallel through the bottom plates.

The method is used in the production of various foods, such as bars, pralines, waffles, sugar products, products having a long service life and fine bakery products, which are totally or partially coated. The coatings are thick or thin layers, particularly of chocolate, caramel, cocoa icing, shortening icing and sugar icing. The coatings are cooled in the cooling duct in order to solidify. The cooling duct may also include other devices for adjusting and controlling the moisture and other parameters.

Cooling and solidification of the coatings is a process which can basically be dimensioned freely in accordance with the rules of thermodynamics. Since structure, gloss and hardness of the coating, for example, of chocolate, must meet certain quality requirements, the selection of the cooling pattern with respect to temperature and speed of the cooling agent is limited in accordance with experiences in the field, so that, for example, the polymorphous cocoa butter in the chocolate crystallizes in a favorable structure. This is called gentle cooling.

When the same products are manufactured and cooled in a production plant over a longer period of time, those skilled in the field are able to adjust the correct production parameters. For example, when operating in the counter-current flow method, the cooling agent enters with a certain temperature and, due to the heating by the products, is discharged with a higher temperature. This temperature is usually kept constant during a production sequence, in order to ensure a uniform quality. Accordingly, the appropriate parameters and, thus, the desired cooling curves can only be adjusted and maintained after a certain production period, particularly when the products have reached the end of the cooling duct. However, after a production start, a production stop and a production interruption, problems occur since the cooling agent temperature at the cooling agent exit, i.e., in the counter-current flow method, is too low at the product entry. At the production start, there are no products in the cooling duct, so that no heat can be transported away. This means that the cooling medium temperature is too low and new entering products are cooled too much. This has a negative influence and usually leads to the production of waste. The same is true in the case of production interruptions.

SUMMARY OF THE INVENTION

Therefore, it is the primary object of the present invention to provide a method of the above-described type in which a product is produced with the desired quality from the outset even after production beginning or after restarting the production after an interruption.

In accordance with the present invention, the method includes adjusting a delta-T (actual value) between cooling agent exit and cooling agent entry for a certain product to be coated by regulating the cooling agent flow speed, entering this delta-T as nominal value in a computer as the parameter for further cooling of this product, and regulating the cooling agent entry temperature, particularly in the case of production interruption or restart of production, by the difference determined in the computer between the delta-T determined as the nominal value and the actually measured value.

When cooling is effected by means of air as well as by means of a liquid cooling agent, the delta-T regulation is carried out for both cooling agents.

Accordingly, in accordance with the present invention, initially a delta-T value is determined, i.e., a difference between the cooling agent exit and the cooling agent entry, wherein the manufacture of a product having the desired quality is ensured. The adjustment of this delta-T value is effected by regulating the cooling agent flow speed. As the cooling agent flow speed decreases, the delta-T increases. When this value is determined, it is entered as a nominal value for this production in a computer, so that this value is fixed for the further cooling of the product. When production interruptions occur, the cooling agent entry speed is regulated in such a way that the actual value is determined at the cooling agent exit and the nominal value is changed accordingly by this actual value. In the case of a restart of the production, this means that the temperature of the cooling agent exit is initially lower because there are no products travelling from the entry to the exit which would transmit a certain quantity of heat. The temperature at the cooling agent entry is then raised by the difference between the delta-T nominal value and the delta-T actual value at the cooling agent exit, so that the correct cooling agent exit temperature is adjusted at the entry of the products into the cooling duct when carrying out the counter-current flow method. As production continues, a readjustment to the originally adjusted parameters takes place. Accordingly, in accordance with the present invention, an automatic compensation of the cooling agent temperatures takes place.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a schematic side view of a cooling duct for carrying out the method according to the present invention;

FIG. 2 is a diagram showing the cooling curves for an air cooling method;

FIG. 3 is a diagram corresponding to FIG. 2 showing the cooling curves for a liquid cooling method; and FIG. 4 is a diagram showing the coating temperature.

DESCRIPTION OF THE PREFERRED EMBODIMENTS

The cooling duct 1 shown in FIG. 1 is composed of two cooling zones 2 and 3. The conveyor belt 4 conveys the coated products in the direction of arrows 6. Each zone 2 and 3 has three base plates 7 for contact cooling from below. The base plates of each cooling zone are connected in series to each other. Of course, more of fewer base plates can also be provided. A combination of base plates arranged in series or parallel to each other is also basically possible. However, an arrangement in series is always required for carrying out the method of the present invention. Parallel arrangements are only possible as intermediate stages.

A pump 8 delivers water as the cooling agent in the direction of the arrows 6 through the base plates. A frequency transformer is denoted by reference numeral 22. The temperatures of the cooling agent at the entry and exit thereof are measured by temperature sensors at 10 and 11. The cooling agent temperatures are entered for regulation in a computer which is mounted in a switch cabinet or control panel of the apparatus. The conveyor belt then travels through the cooling zone 3. Cooling in the base of zone 3 is controlled as in zone 2. The cooling zone 2 operates with co-current flow and the cooling zone 3 operates with counter-current flow cooling.

The cooling agent pumped through the base plates is maintained by means of the delta-T regulation and automatic compensation within a defined temperature range.

The convection cooling method is carried out by means of air 15 which is taken in by a blower 16 through the filter 19 and a heat exchanger 17 for cooling. A heat exchanger for heating is denoted by reference numeral 18. The front and back temperatures of the cooling air are measured at 20 and 21 by temperature sensors. The measured temperatures are entered into the programmed computer.

In the following example, numerical values are given for the surface cooling and bottom cooling first without compensation and then with automatic compensation for the bottom cooling with water as the cooling agent and the surface cooling with air.

Bottom Cooling

The product cooling at the bottom can be influenced separately in the two zones. All parameters of the apparatus are adjusted and maintained in accordance with the specific production. Only the required cooling water quantity is controlled with the continuous valves by the regulator with an appropriately programmed control.

Using the temperature adjustment and the water entry of the base plates, the entry temperature can be adjusted between 55° and 70° F. The bottom temperature should be adjusted to at most 5° F. below the air temperature in order to prevent a condensation water formation on the base plates.

The water quantity can be preadjusted through the water pumps between 0 and 100%. The resulting delta-T forms an appropriate cooling curve.

Using the delta-T compensation, wherein the temperatures at the entry and the exit of the base plates are measured and compared, a temperature difference occurs during normal production. This temperature difference forms the delta-T nominal value. This nominal value depends on the adjusted water quantity and is determined during the first production. If this delta-T nominal value is not reached during production start and/or production interruptions, the nominal value of the water entry of the base plates changes by the appropriate value. This control makes it possible to prevent excessive cooling of the first product rows in the case of production interruptions.

Adjustment Examples

Without compensation, the first product rows can become too cold.

| | |
|---|---|
| Nominal value water entry = 60.0° F. | Actual value = 60.0° F. |
| Nominal value water exit = 69.0° F. | Actual value = 65.5° F. |
| delta-T | Actual value = 5.5° F. |
| With automatic compensation | |
| Nominal value entry = 60.0° F. + delta-T diff. 3.5° F. | Actual value = 63.5° F. |
| Nominal value water exit = 69.0° F. | Actual value = 69.0° F. |
| Nominal value delta-T = 9.0° F. | Actual value = 5.5° F. |

Surface Cooling

Product cooling at the surfaces can be carried out in both zones separately by the following adjustments: All apparatus parameters are adjusted and maintained in accordance with the production. Only the required cooling water quantity is controlled with the continuous valves by the regulator with programmable control.

It is basically possible to adjust mechanically by means of a flap at the evaporator unit as to whether radiation cooling and/or convection cooling are to be carried out. Convection cooling can be adjusted between 0% and 100%.

With the air entry temperature, the air temperature adjustment after the blowers between 55° to 70° F. and the adjusted air speed between 0% and 100%, the resulting delta-T forms an appropriate cooling curve.

By adjusting air heating, the relative humidity of the cooling air is adjusted. The resulting relative moisture is strongly dependent on the air speed and the air temperature and is not measured and indicated for this reason.

Using the delta-T compensation, the air temperatures before the heat exchanger and behind the blowers are measured and compared. During normal production, there is a temperature difference. The delta-T nominal value depends on the adjusted air speed and should only be set during production. When the delta-T nominal value is not reached during a production start and/or production interruption, the nominal value of the air entry temperature changes by the corresponding value.

Adjustment Examples

Without compensation, the first products rows may become too cold.

| | |
|---|---|
| Nominal value air after the blowers = 63.0° F. | Actual value = 63.0° F. |
| Nominal value air in front of heat exchanger = 70.0° F. | Actual value = 67.5° F. |

-continued

| | |
|---|---|
| delta-T | Actual value = 4.5° F. |
| With automatic compensation | |
| Nominal value air after the blowers = 63.0° F. + delta-T diff. 2.5° F. | Actual value = 65.5° F. |
| Nominal value air in front of heat exchanger = 70.0° F. | Actual value = 70.0° F. |
| Nominal value delta-T = 7.0° F. | Actual value = 4.5° F. |

The cooling air heated by the convection or radiation is maintained within a defined temperature range by means of the delta-T control and automatic compensation.

FIGS. 2–4 show types of operation of the cooling duct for bottom cooling, shown in FIG. 3, and top cooling by air, shown in FIG. 2. The pattern of the coating temperature shown in FIG. 4 is schematically illustrated in dependence on the above-mentioned types of operation.

In the diagram of FIG. 3 for bottom cooling, the curve 29 represents low water speeds, the curve 28 represents medium water speeds and curve 27 represents high water speeds. The same is applicable to the air speeds in the diagram of FIG. 2.

The delta-T value of the cooling media increases as the flow speeds of the cooling medium decrease.

The diagram of FIG. 4 of the coating temperature is derived from the diagrams of FIGS. 2 and 3 and shows a possible pattern of cooling of the coating.

While specific embodiments of the invention have been shown and described in detail to illustrate the inventive principles, it will be understood that the invention may be embodied otherwise without departing from such principles.

We claim:

1. A method of cooling coated foods, particularly confectionery and baked goods, wherein the products are moved by a conveyor belt through a cooling duct in which air is used as cooling agent, the method comprising the steps of:
   a) adjusting a delta-T value between a cooling agent exit and a cooling agent entry for a specific product to be coated by regulating a cooling agent flow speed;
   b) entering the delta-T as a nominal value in a computer as a parameter for further cooling of this product;
   c) regulating the cooling agent entry temperature by the difference determined in the computer between the delta-T value set as the nominal value and the actually measured value.

2. The method according to claim 1, wherein step c) is carried out at production interruption or restart of production.

3. A method of cooling coated foods, particularly confectionery and baked goods, wherein the products are conveyed by a conveyor belt through a cooling duct over base plates acting as heat exchangers with a liquid cooling agent flowing through the heat exchangers, the method comprising the steps of:
   a) adjusting a delta-T value between a cooling agent exit and a cooling agent entry for a specific product to be coated by regulating a cooling agent flow speed;
   b) entering the delta-T as a nominal value in a computer as a parameter for further cooling of this product;
   c) regulating the cooling agent entry temperature by the difference determined in the computer between the delta-T value set as the nominal value and the actually measured value.

4. The method according to claim 3, wherein step c) is carried out at production interruption or restart of production.

5. A method of cooling coated foods, particularly confectionery and baked goods, wherein the products are conveyed by a conveyor belt through a cooling duct, wherein air is directed against the products as a cooling agent, and wherein additionally the products are conveyed over base plates acting as heat exchangers with a liquid cooling agent flowing through the heat exchangers, the method comprising the steps of:
   a) adjusting a delta-T value between a cooling agent exit and a cooling agent entry for a specific product to be coated by regulating a cooling agent flow speed;
   b) entering the delta-T as a nominal value in a computer as a parameter for further cooling of this product;
   c) regulating the cooling agent entry temperature by the difference determined in the computer between the delta-T value set as the nominal value and the actually measured value.

6. The method according to claim 3, wherein the base plates are connected in series in a direction of movement of the conveyor belt, so that the liquid cooling agent flows successively through the base plates.

7. The method according to claim 5, wherein the base plates are connected in series in a direction of movement of the conveyor belt, so that the liquid cooling agent flows successively through the base plates.

* * * * *